United States Patent
Hunt et al.

(10) Patent No.: US 9,245,112 B2
(45) Date of Patent: Jan. 26, 2016

(54) APPARATUS AND METHOD FOR MANAGING ENTITLEMENTS TO PROGRAM CODE

(75) Inventors: Oliver J. Hunt, San Francisco, CA (US); Ivan Krstic, Sunnyvale, CA (US); Gavin Barraclough, Santa Clara, CA (US); Filip J. Pizlo, Capitola, CA (US)

(73) Assignee: Apple Inc., Cupertino, CA (US)

( * ) Notice: Subject to any disclaimer, the term of this patent is extended or adjusted under 35 U.S.C. 154(b) by 266 days.

(21) Appl. No.: 13/487,096

(22) Filed: Jun. 1, 2012

(65) Prior Publication Data

US 2013/0326492 A1 Dec. 5, 2013

(51) Int. Cl.
*G06F 7/04* (2006.01)
*G06F 21/54* (2013.01)
*G06F 9/445* (2006.01)

(52) U.S. Cl.
CPC ............ *G06F 21/54* (2013.01); *G06F 9/44521* (2013.01); *G06F 2221/2123* (2013.01)

(58) Field of Classification Search
None
See application file for complete search history.

(56) References Cited

U.S. PATENT DOCUMENTS

| 7,716,476 | B2 * | 5/2010 | Burkhardt et al. | 713/167 |
| 2007/0169071 | A1 * | 7/2007 | Martin et al. | 717/166 |
| 2009/0249064 | A1 * | 10/2009 | De Atley et al. | 713/164 |
| 2010/0023995 | A1 * | 1/2010 | Kim | 726/1 |
| 2011/0088084 | A1 * | 4/2011 | Yasaki et al. | 726/5 |

* cited by examiner

*Primary Examiner* — Van Nguyen
*Assistant Examiner* — Melissa Alfred
(74) *Attorney, Agent, or Firm* — Downey Brand LLP (57) ABSTRACT

A method, apparatus and machine readable medium are described for managing entitlements on a computing device. For example, one embodiment of a method comprises: loading a first application into a system memory of a computing device; for each library value/symbol pair referenced by the first application, determining whether the first application has a correct entitlement to be linked with the library value/symbol pair; wherein if the application does not have the correct entitlement associated with the library value/symbol pair, then denying linking to the library value/symbol pair and/or linking the application to an alternate library value/symbol pair which does not have the entitlement associated therewith; and if the application has the correct entitlement associated with the library value/symbol pair, then linking the application to the library value/symbol pair with the entitlement in the system memory.

26 Claims, 7 Drawing Sheets

APPARATUS AND METHOD FOR MANAGING ENTITLEMENTS TO PROGRAM CODE

BACKGROUND

1. Field of the Invention

This invention relates generally to the field of data processing systems. More particularly, the invention relates to an improved apparatus and method for providing entitlements to program code.

2. Description of Related Art

Figure 1:
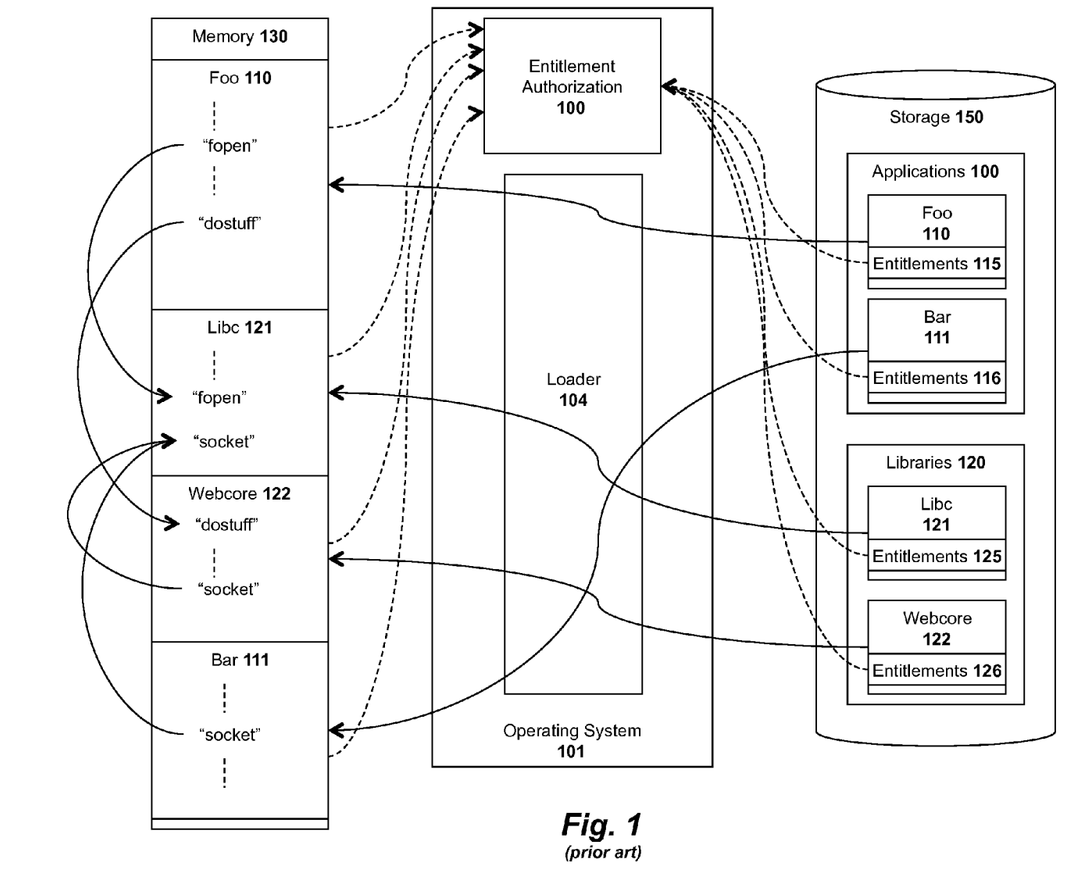
FIG. 1 illustrates a current implementation for loading applications and enforcing entitlements.

A "loader" is the part of an operating system responsible for loading programs into memory. FIG. 1 illustrates an exemplary loader 104 of an operating system 101 which is loading two applications from storage 150 into memory 130: foo 110 and bar 111. In this example, foo 110 and bar 111 may require functions contained in various different libraries 120, two of which are shown in FIG. 1: libc 121 and webcore 122.

When loading an application to memory, the loader must dynamically link the library symbols referenced by the application or library being loaded. These symbols may represent references to functions that may be called, or values to be used. For example, in FIG. 1 the loader 104 replaces the reference for function fopen in application foo 110 with a memory address of fopen, which has been provided by the libc library 121 previously loaded into memory. Similarly, the loader 104 replaces the reference for function dostuff with the memory address for dostuff which has been provided by the webcore library 122 previously loaded into memory.

One or more "entitlements" may also be provided to applications and libraries specify whether the application or library should be permitted to access system resources. By way of example, an entitlement may specify whether an application is permitted to open a network socket, access a certain directory, or print documents. In the example illustrated in FIG. 1, application foo 110 has entitlements 115, application bar 111 has entitlements 116, library libc has entitlements 125 and library webcore 122 has entitlements 126.

In current implementations, entitlements are enforced at runtime by entitlement authorization logic 100, after an application, including all of its libraries have been fully loaded into memory by the loader. One limitation of current implementations is that if any library used by an application has a particular entitlement, then any application which uses that library automatically has that entitlement (i.e., entitlements are enforced at the granularity of a running process defined by the application and its libraries). For example, if the entitlements 126 of library webcore 122 specify that webcore is permitted to use the network via function socket, then any application which uses webcore will be assigned this entitlement. Consequently, even applications such as foo 110 which do not require access to the network will automatically have an entitlement to access the network, opening a potential security vulnerability which may be exploited by hackers. Similarly, the application developer for bar 111 may want to open network sockets using its own networking program code rather than the program code provided by library webcore. Nonetheless, if application bar 111 uses library webcore 122 in any manner, it will automatically be provided with webcore's entitlement to use the network.

Accordingly, what is needed is the ability to control entitlements at a more precise granularity. It would also be beneficial to control access to entitlements at load/link time, before an application and its libraries are fully executing in memory.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below are embodiments of an apparatus, method, and machine-readable medium for enforcing entitlements at runtime at a symbol-level granularity. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

Figure 2:
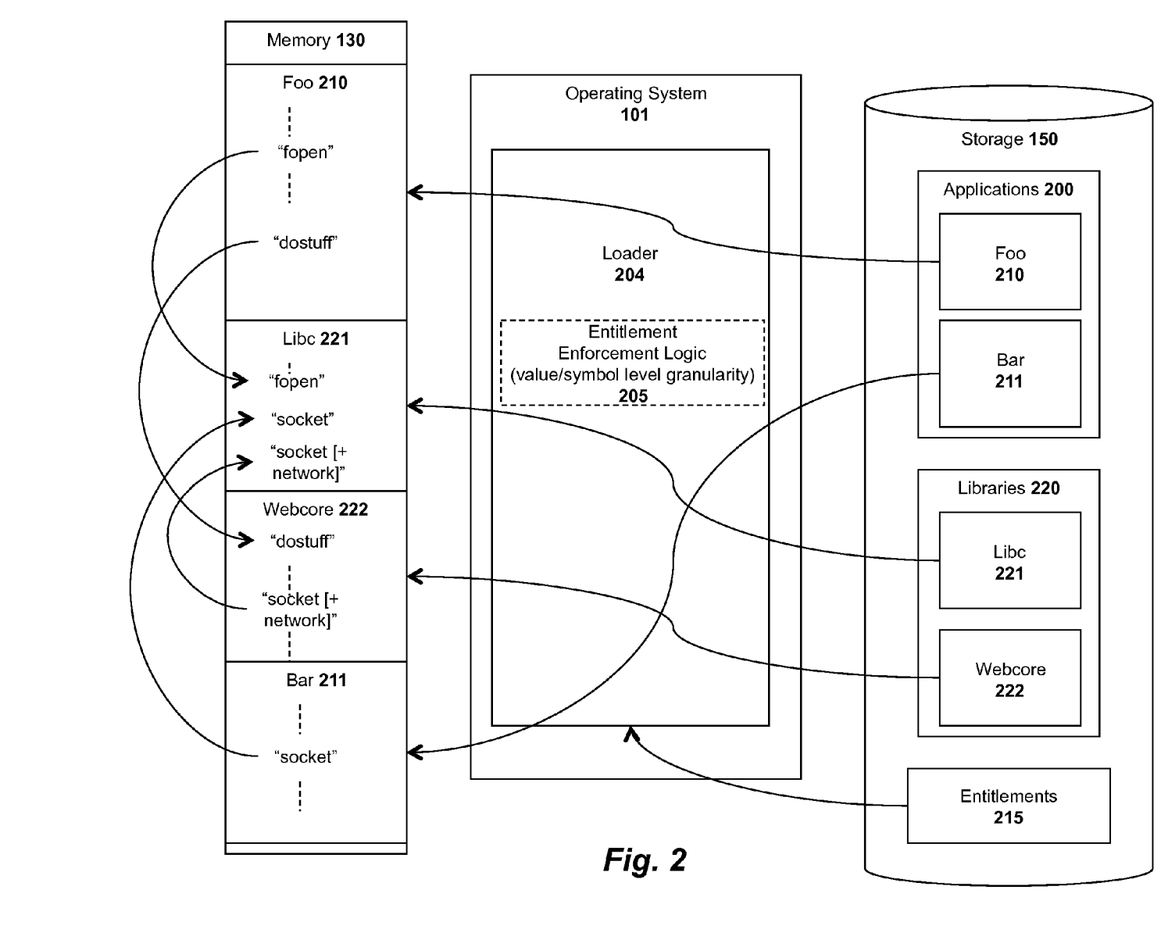
FIG. 2 illustrates one embodiment of a system for loading applications and managing entitlements at a function level granularity.

In one embodiment illustrated in FIG. 2, a loader 204 is provided which (in contrast to prior loaders) includes entitlement enforcement logic 205 for enforcing entitlements 215 at the granularity of any value/symbol that the loader 204 is responsible for providing including, by way of example and not limitation, functions, externally declared variables and constants, types, and classes. In one particular embodiment, symbol-level granularity is employed using functions provided by the libraries 220 used by the operating system 101. Specifically, in this embodiment, each individual function provided by each library may be designated (or not designated) to have a particular entitlement. For example, libc now has two version of a socket function, one which has an entitlement to use the network ("socket [+network]") and one which does not have the entitlement to use the network ("socket"). The loader 204 will only link to the function with the entitlement to use the network ("socket [+network]") to applications which specifically have this entitlement. Thus, in the example shown in FIG. 2, the loader links function "socket" in application bar 211 to the function "socket" in libc 221 which does not have the entitlement to use the network (e.g., bar 211 may have its own program code to access the network and "socket" in libc 221 is a dummy socket without network access). In contrast, the loader 204 will link function "socket [+network]" in library webcore to the function "socket [+network]" which has the entitlement to use the network because library webcore 222 has the correct symbol or token to gain access to this entitlement. The end result is that an application which uses library webcore 222 (e.g., foo 210 and bar 211) will not automatically be provided with access to the network simply by using webcore (i.e., it will need its own entitlement to do so), thereby making the system less vulnerable to attack by hackers.

In one embodiment, an application will specify its entitlements using a special symbol or token, which the loader will interpret to perform a linking to the library function with that entitlement. Thus, as mentioned, any application with the correct symbol or token for "socket [+network]" will be given the entitlement to access the network via the libc function "socket [+network]" but any attempt to access this function without the correct symbol or token, will be provided with access to the dummy function "socket" which does not have the entitlement.

In one embodiment, special application programming interface (API) functions are provided to application developers who have the right to access the entitlement provided by a library function (e.g., a specific call to function "socket_network" which has the entitlement). Alternatively, the regular API function may be used, but those applications which have the entitlement will use an explicit token as a parameter with that API function which will provide the entitlement (e.g., "socket [+network token]"). The underlying principles of the invention are the same regardless of the specific implementation used.

Figure 3:
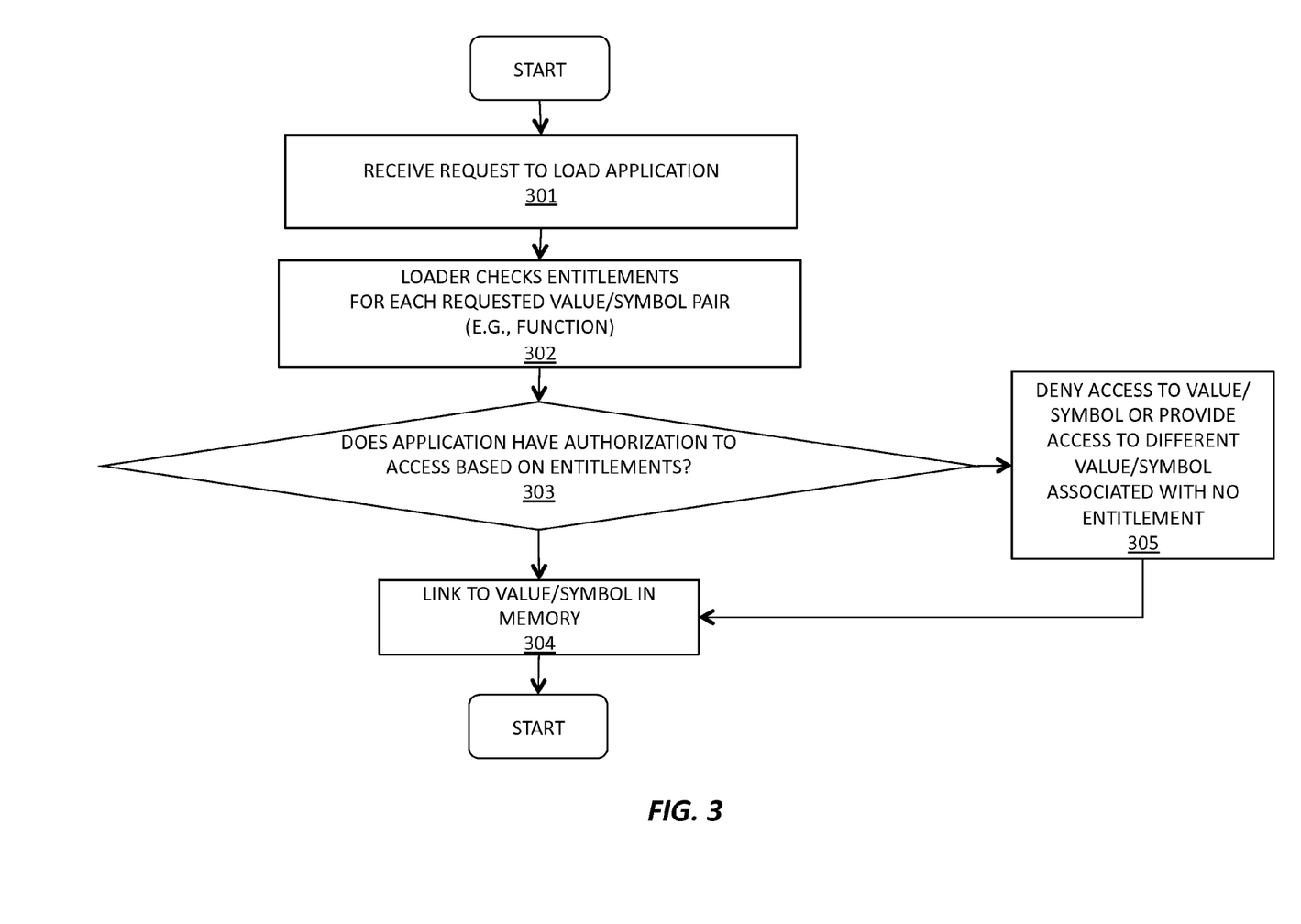
FIG. 3 illustrates one embodiment of a method for loading applications and managing entitlements at a function level granularity.

A method in accordance with one embodiment of the invention is illustrated in FIG. 3. At 301 a request is received to load an application into the system memory space. At 302, for each designated library function, the loader performs an entitlement check to determine which version of the library function should be linked (e.g., one with or without entitlements). At 303, if the loader determines that the application has the correct entitlement (e.g., specified via the correct API call or correct token parameter), then it will link to this function in memory at 304. If, however, the application does not have the correct entitlement (e.g., does not have the correct API call or token parameter), then it will either deny access entirely, or will link to an alternate function which does not have the entitlement (e.g., "socket" instead of "socket [+network]").

Different API Embodiments

Different embodiments described herein include an application programming interface (API) implemented by a software component (hereinafter "API implementing software component") that allows a different software component (hereinafter "API calling software component") to access and use one or more functions, methods, procedures, data structures, and/or other services provided by the API implementing software component. For example, an API allows a developer of an API calling software component (which may be a third party developer) to leverage specified features provided by an API implementing software component. There may be one API calling software component or there may be more than one such software component. An API can be a source code interface that a computer system or program library provides in order to support requests for services from a software application. An API can be specified in terms of a programming language that can be interpretative or compiled when an application is built, rather than an explicit low level description of how data is laid out in memory.

The API defines the language and parameters that API calling software components use when accessing and using specified features of the API implementing software component. For example, an API calling software component accesses the specified features of the API implementing software component through one or more API calls (sometimes referred to as function or method calls) exposed by the API. The API implementing software component may return a value through the API in response to an API call from an API calling software component. While the API defines the syntax and result of an API call (e.g., how to invoke the API call and what the API call does), the API typically does not reveal how the API call accomplishes the function specified by the API call. Various function calls or messages are transferred via the one or more application programming interfaces between the calling software (API calling software component) and an API implementing software component. Transferring the function calls or messages may include issuing, initiating, invoking, calling, receiving, returning, or responding to the function calls or messages. Hence, an API calling software component can transfer a call and an API implementing software component can transfer a call.

Figure 4:
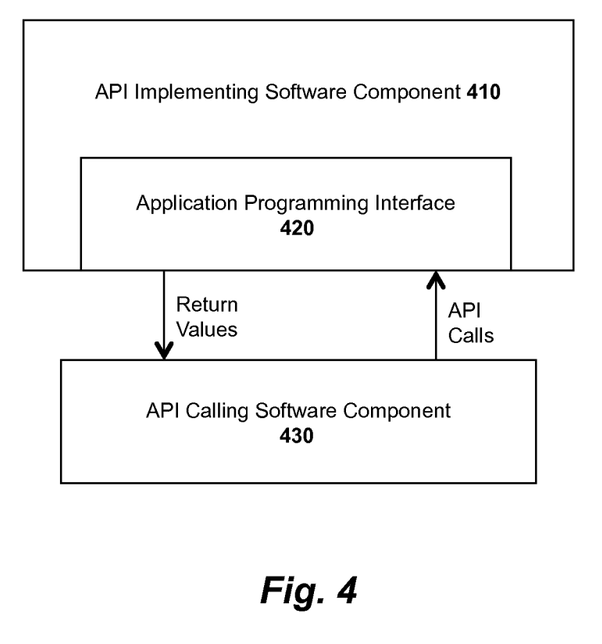
FIG. 4 illustrates an application programming interface employed in one embodiment of the invention.
Figure 5:
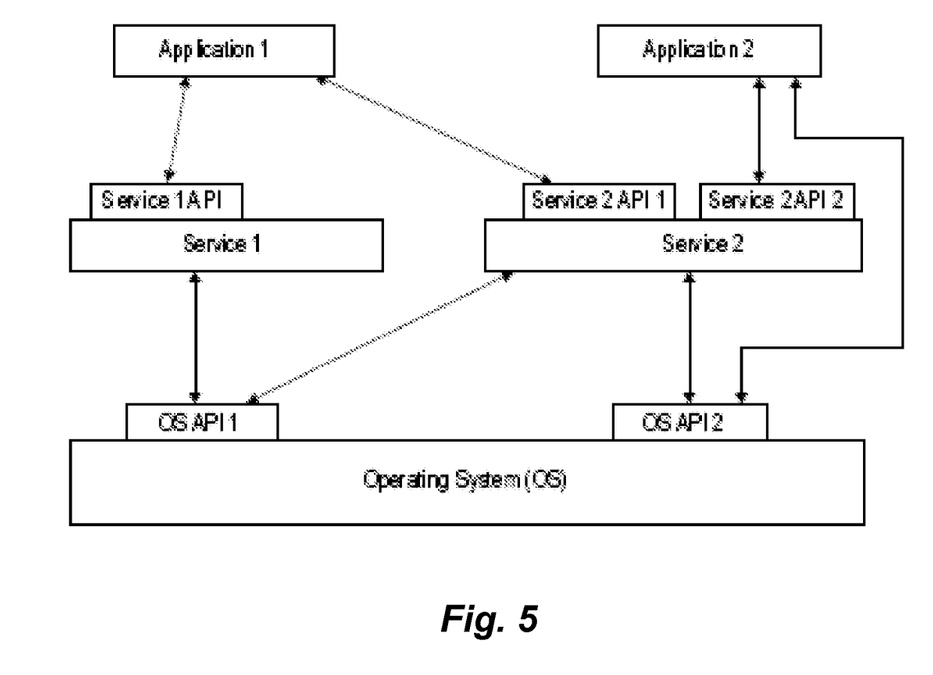
FIG. 5 illustrates exemplary applications interfacing to services and operating systems in accordance with one embodiment of the invention.

By way of example, the API implementing software component 2010 and the API calling software component may be an operating system, a library, a device driver, an API, an application program, or other software module (it should be understood that the API implementing software component and the API calling software component may be the same or different type of software module from each other). The API calling software component may be a local software component (i.e., on the same data processing system as the API implementing software component) or a remote software component (i.e., on a different data processing system as the API implementing software component) that communicates with the API implementing software component through the API over a network. It should be understood that an API implementing software component may also act as an API calling software component (i.e., it may make API calls to an API exposed by a different API implementing software component) and an API calling software component may also act as an API implementing software component by implementing an API that is exposed to a different API calling software component.

The API may allow multiple API calling software components written in different programming languages to communicate with the API implementing software component (thus the API may include features for translating calls and returns between the API implementing software component and the API calling software component); however the API may be implemented in terms of a specific programming language.

FIG. 4 illustrates one embodiment of an API architecture which includes an API implementing software component 410 (e.g., an operating system, a library, a device driver, an API, an application program, or other software module) that implements the API 420. The API 420 specifies one or more functions, methods, classes, objects, protocols, data structures, formats and/or other features of the API implementing software component that may be used by the API calling software component 430. The API 420 can specify at least one calling convention that specifies how a function in the API implementing software component receives parameters from the API calling software component and how the function returns a result to the API calling software component. The API calling software component 430 (e.g., an operating system, a library, a device driver, an API, an application program, or other software module), makes API calls through the API 420 to access and use the features of the API implementing software component 410 that are specified by the API 420. The API implementing software component 410 may return a value through the API 420 to the API calling software component 430 in response to an API call.

It will be appreciated that the API implementing software component 410 may include additional functions, methods, classes, data structures, and/or other features that are not specified through the API 420 and are not available to the API calling software component 430. It should be understood that the API calling software component 430 may be on the same system as the API implementing software component 410 or may be located remotely and accesses the API implementing software component 410 using the API 420 over a network. While FIG. 4 illustrates a single API calling software component 430 interacting with the API 420, it should be understood that other API calling software components, which may be written in different languages (or the same language) than the API calling software component 430, may use the API 420.

The API implementing software component 410, the API 420, and the API calling software component 430 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

In FIG. 4 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Exemplary Data Processing Devices

Figure 6:
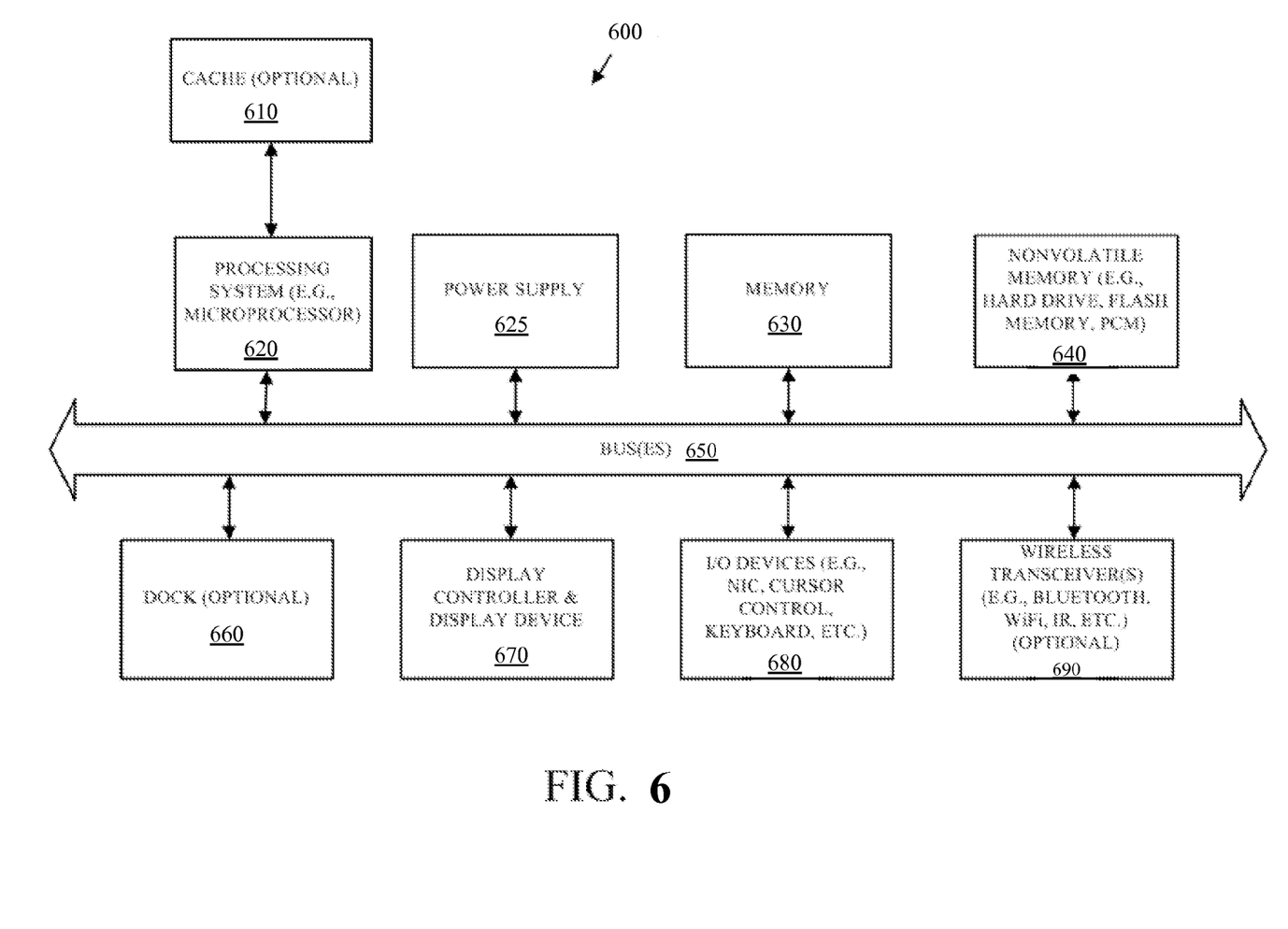
FIG. 6 illustrates an architecture of a data processing device on which embodiments of the invention may be implemented.

FIG. 6 is a block diagram illustrating an exemplary computer system which may be used in some embodiments of the invention. It should be understood that while FIG. 6 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 6, the computer system 600, which is a form of a data processing system, includes the bus(es) 650 which is coupled with the processing system 620, power supply 625, memory 630, and the nonvolatile memory 640 (e.g., a hard drive, flash memory, Phase-Change Memory (PCM), etc.). The bus(es) 650 may be connected to each other through various bridges, controllers, and/or adapters as is well known in the art. The processing system 620 may retrieve instruction(s) from the memory 630 and/or the nonvolatile memory 640, and execute the instructions to perform operations as described above. The bus 650 interconnects the above components together and also interconnects those components to the optional dock 660, the display controller & display device 670, Input/Output devices 680 (e.g., NIC (Network Interface Card), a cursor control (e.g., mouse, touchscreen, touchpad, etc.), a keyboard, etc.), and the optional wireless transceiver(s) 690 (e.g., Bluetooth, WiFi, Infrared, etc.).

Figure 7:
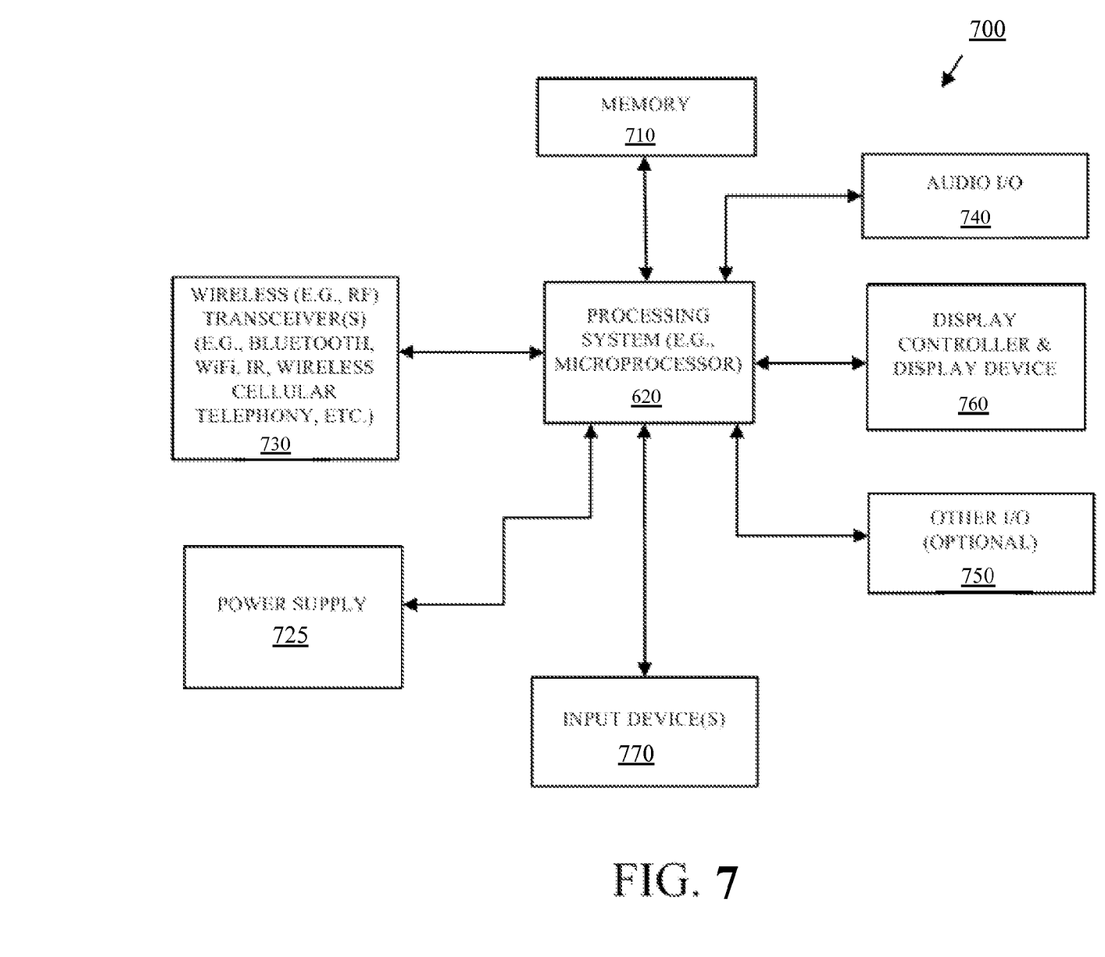
FIG. 7 illustrates another architecture of a data processing device on which embodiments of the invention may be implemented.

FIG. 7 is a block diagram illustrating an exemplary data processing system which may be used in some embodiments of the invention. For example, the data processing system 700 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 700 may be a network computer or an embedded processing device within another device.

According to one embodiment of the invention, the exemplary architecture of the data processing system 700 may used for the mobile devices described above. The data processing system 700 includes the processing system 720, which may include one or more microprocessors and/or a system on an integrated circuit. The processing system 720 is coupled with a memory 710, a power supply 725 (which includes one or more batteries) an audio input/output 740, a display controller and display device 760, optional input/output 750, input device(s) 770, and wireless transceiver(s) 730. It will be appreciated that additional components, not shown in FIG. 7, may also be a part of the data processing system 700 in certain embodiments of the invention, and in certain embodiments of the invention fewer components than shown in FIG. 7 may be used. In addition, it will be appreciated that one or more buses, not shown in FIG. 7, may be used to interconnect the various components as is well known in the art.

The memory 710 may store data and/or programs for execution by the data processing system 700. The audio input/output 740 may include a microphone and/or a speaker to, for example, play music and/or provide telephony functionality through the speaker and microphone. The display controller and display device 760 may include a graphical user interface (GUI). The wireless (e.g., RF) transceivers 730 (e.g., a WiFi transceiver, an infrared transceiver, a Bluetooth transceiver, a wireless cellular telephony transceiver, etc.) may be used to communicate with other data processing systems. The one or more input devices 770 allow a user to provide input to the system. These input devices may be a keypad, keyboard, touch panel, multi touch panel, etc. The optional other input/output 750 may be a connector for a dock.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details.

For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

We claim:

1. A computer-implemented method for enforcing entitlements, the computer-implemented method comprising:
    loading a library into a memory of a computing device, wherein the library includes a first library function having a first entitlement to use a system resource of the computing device and a second library function not having the first entitlement;
    loading an application into the memory of the computing device, the application having a second entitlement;
    determining, by the computing device, whether the second entitlement provides access to the system resource; and
    when the second entitlement does not provide access to the system resource:
        denying linking between the application and the first library function to prevent the application from using the system resource, and
        linking the application to the second library function to restrict access to the system resource.

2. The computer-implemented method as in claim 1, wherein determining comprises identifying that the application has made an appropriate application programming interface (API) call required to access the library.

3. The computer-implemented method as in claim 1, wherein determining comprises identifying that the application has made an API call using a correct token as a parameter to access the library with the first entitlement.

4. The computer-implemented method as in claim 1, wherein the system resource is a network socket that provides access to a network.

5. The computer-implemented method as in claim 1, wherein the application is linked to at least one library with a particular entitlement, but the application is denied access to the particular entitlement.

6. The computer-implemented method as in claim 1, wherein the system resource corresponds to a type of socket function.

7. A computing device, comprising:
    a processor; and
    a memory storing instructions that, when executed by the processor, cause the computing device to perform steps that include:
        loading a library into a memory of the computing device, wherein the library includes a first library function having a first entitlement to use a system resource of the computing device and a second library function not having the first entitlement;
        loading an application into the memory of the computing device, the application having a second entitlement;
        determining, by the computing device, whether the second entitlement provides access to the system resource; and
        when the second entitlement does not provide access to the system resource:
            denying linking between the application and the first library function to prevent the application from using the system resource, and
            linking the application to the second library function to restrict access to the system resource.

8. The computing device as in claim 7, wherein determining whether the second entitlement provides access to the system resource comprises identifying that the application has made an appropriate application programming interface (API) call required to access the library.

9. The computing device as in claim 7, wherein determining whether the second entitlement provides access to the system resource comprises identifying that the application has made an API call using a correct token as a parameter to access the library with the first entitlement.

10. The computing device as in claim 7, wherein the system resource is a network socket that provides access to a network.

11. The computing device as in claim 7, wherein the application is linked to at least one library with a particular entitlement but the application is denied access to the particular entitlement.

12. The computing device as in claim 7, wherein the steps further include:
    linking the application to the first function to permit the application to use the first function when the application has the first entitlement of the first function.

13. The computing device as in claim 7, wherein the system resource corresponds to a type of socket function.

14. A machine-readable non-transitory storage medium storing instructions that, when executed by a processor included in a computing device, cause the computing device to carry out steps that include:
    loading a library into a memory of the computing device, wherein the library includes a first library function having a first entitlement to use a system resource of the computing device and a second library function not having the first entitlement;
    loading an application into the memory of the computing device, the application having a second entitlement;
    determining, by the computing device, whether the second entitlement provides access to the system resource; and
    when the second entitlement does not provide access to the system resource:
        denying linking between the application and the first library function to prevent the application from using the system resource, and
        linking the application to the second library function to restrict access to the system resource.

15. The machine-readable non-transitory storage medium as in claim 14, wherein determining comprises identifying that the application has made an appropriate application programming interface (API) call required to access the library.

16. The machine-readable non-transitory storage medium as in claim 14, wherein determining comprises identifying that the application has made an API call using a correct token to access the library with the first entitlement.

17. The machine-readable non-transitory storage medium as in claim 14, wherein the system resource is a network socket that provides access to a network.

18. The machine-readable non-transitory storage medium as in claim 14, wherein the application is linked to at least one library with a particular entitlement but the application is denied access to the particular entitlement.

19. The machine-readable non-transitory storage medium as in claim 14, wherein the system resource corresponds to a type of socket function.

20. A method for enforcing application entitlements, the method comprising:
    loading a library into a memory of a computing device, wherein the library includes a first library function having a first entitlement to use a network resource and a second library function not having the first entitlement;
    loading an application into the memory of the computing device, the application having a second entitlement;
    determining, by the computing device, whether the second entitlement provides access to the network resource; and
    when the second entitlement does not provide access to the network resource:
        denying linking between the application and the first library function to prevent the application from using the network resource, and
        linking the application to the second library function to restrict access to the network resource.

21. The method as in claim 20, further comprising:
    identifying that the application has made an appropriate application programming interface (API) call required to access the library.

22. The method as in claim 20, further comprising:
    identifying that the application has made an API call using a correct token as a parameter to access the library with the first entitlement.

23. The method as in claim 20, wherein the network resource is a network socket that provides access to a network.

24. The method as in claim 20, wherein the application is linked to at least one library with a particular entitlement but the application is denied access to the particular entitlement.

25. The method as in claim 20, further comprising linking the application to the first function to permit the application to use the first function when the application has the first entitlement of the first function.

26. The method as in claim 20, wherein the network resource corresponds to a type of socket function.

\* \* \* \* \*